United States Patent
Sheehan

(10) Patent No.: US 7,474,656 B2
(45) Date of Patent: Jan. 6, 2009

(54) DATA TRANSFER TO NODES OF A COMMUNICATION NETWORK USING SELF-REPLICATING CODE

(75) Inventor: Michael J. Sheehan, Naperville, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 764 days.

(21) Appl. No.: 10/786,911

(22) Filed: Feb. 25, 2004

(65) Prior Publication Data

US 2005/0185662 A1    Aug. 25, 2005

(51) Int. Cl.
*H04L 12/28* (2006.01)

(52) U.S. Cl. .................. 370/390; 370/255; 370/408; 370/432; 370/400; 709/231; 709/217; 709/245

(58) Field of Classification Search ............ 370/390, 370/255, 408, 432, 400; 709/220–223, 201, 709/206, 238, 245, 231, 242, 217; 707/10
See application file for complete search history.

(56) References Cited

U.S. PATENT DOCUMENTS

| | | | | |
|---|---|---|---|---|
| 6,233,601 | B1 * | 5/2001 | Walsh ................. | 709/202 |
| 6,560,643 | B1 * | 5/2003 | Shepherd et al. ...... | 709/220 |
| 6,782,398 | B1 * | 8/2004 | Bahl ................... | 707/200 |
| 7,162,538 | B1 * | 1/2007 | Cordova ............... | 709/238 |
| 2005/0034114 | A1 * | 2/2005 | Weik et al. ............ | 717/172 |

FOREIGN PATENT DOCUMENTS

| | | |
|---|---|---|
| EP | 0928089 A2 | 7/1999 |
| EP | 1505797 A1 | 2/2005 |

OTHER PUBLICATIONS

XP002326878, filed Jan. 2002, Lorenzo Bettini, Rocco De Nicola, Michele Loreti.
Philippe Augerat, Wilfrid Billot, Simon Derr, Cyrille Martin, "A Scalable File Distribution and Operating System Installation Toolkit for Clusters," submitted to CC grid, 2002.

* cited by examiner

*Primary Examiner*—Ricky Ngo
*Assistant Examiner*—Kibrom T Hailu

(57) ABSTRACT

A method and communication network for transferring data is described. For the method, responsive to executing first code in a first node in a communication network, the first node establishes a communication channel with a second node, replicates itself to generate second code, and provides the second code to the second node over the communication channel. Responsive to executing the second code in the second node, the second node establishes a communication channel with a third node, replicates itself to generate third code, and provides the third code to the third node over the communication channel. The second node then receives data from the first node over the communication channel and executes the second code to handle the data. The third node then receives the data from the second node over the communication channel and executes the third code to handle the data.

18 Claims, 8 Drawing Sheets

DATA TRANSFER TO NODES OF A COMMUNICATION NETWORK USING SELF-REPLICATING CODE

BACKGROUND OF THE INVENTION

1. Field of the Invention

The invention is related to the field of communications, and in particular, to transferring data to nodes of a communication network using self-replicating code.

2. Statement of the Problem

Businesses, companies, universities, etc., commonly have a network that interconnects hundreds or thousands of devices. The network may be a Local Area Network (LAN), a Metropolitan Area Network (MAN), a Wide Area Network (WAN) or another network. Network personnel may want to transfer data, such as information, files, software, instructions, etc., to multiple devices on the network. On large networks, it may be inefficient for network personnel to transfer the data individually to each device. If the network personnel tried to transfer the data simultaneously to multiple devices, the network bandwidth may be quickly used up, particularly if the data size is large. Thus, network personnel are continually searching for ways to transfer data to multiple devices on a network to increase efficiency without sacrificing the bandwidth of the network.

One way to transfer data to multiple devices on the network is by multicasting the data over the network. The term "multicast" may be used to describe broadcasting messages or packets to a selected group of devices situated on the network. Typical applications that may benefit from such a system may include video and music broadcasting. Network personnel may use multicasting to transfer data to multiple devices on a LAN. This may solve the problem of handling each device individually. For instance, if network personnel want to install new software on multiple devices connected to the LAN, the network personnel may multicast the software over the LAN to the devices.

One problem with multicasting is that the receiving devices need the appropriate software to receive the multicast. If the receiving devices do not have the appropriate software, then the appropriate software needs to be installed on the receiving devices prior to receiving the data.

Another problem with multicasting is that the sender may not know whether or not the receiving devices received the software. User Datagram Protocol (UDP) is one protocol used for multicasting, and UDP does not guarantee delivery of a message or require an acknowledgment from the receiving device. Thus, the sender is unaware of the transfer status of data. Network personnel may want some type of acknowledgment to ensure that the transfer of the software was successful.

Another concern of network personnel may be viruses. One of the more famous viruses is the Internet worm. Because of the Internet worm, the term "worm" is commonly received in the negative sense as being software that replicates itself repeatedly on a network to "infect" the network (i.e., a virus). However, a worm, as understood by many skilled in the art, is simply software that is self-replicating. Worms do not have to be programmed to propagate uncontrollably or to do harm to a network.

A traditional worm may replicate itself on a series of devices. A worm (parent worm) on a first device may replicate itself (child worm) on another device, then another device, etc. After the parent worm replicates itself on another device to generate the child worm, the parent worm generally does not maintain a communication channel with the child worm. Thus, the parent worm and the child worm are not able to communicate with one another to transfer data. It may be desirable to use worms, or other self-replicating code or software, in a positive manner to transfer data through a network.

SUMMARY OF THE SOLUTION

The invention solves the above and other problems by using self-replicating code in a communication network to transfer data between nodes. The nodes of the communication network do not initially have the code required for the data transfer. The self-replicating code of the invention replicates itself on nodes of the communication network while maintaining communication channels between the nodes. The nodes can then transfer data between one another over the communication channels.

Advantageously, network personnel may use the self-replicating code to transfer data efficiently to multiple nodes on a communication network without sacrificing the bandwidth of the network. Also, network personnel do not need to pre-install code on the nodes of the communication network to facilitate the data transfer. The self-replicating code can spawn itself on the nodes of the network to facilitate the data transfer. Also, because the code on the nodes maintains a communication channel between the nodes, network personnel may monitor the status of a data transfer in real time as the nodes exchange control and status information with a control node.

One exemplary embodiment of the invention includes a method of transferring data in a communication network. For the method, a first node of the communication network executes first code to establish a communication channel with a second node. The first node also executes the first code to replicate itself to generate second code, and to provide the second code to the second node over the communication channel. The second node executes the second code to establish a communication channel with a third node. The second node also executes the second code to replicate itself to generate third code, and to provide the third code to the third node over the communication channel. The method may include establishing communication channels and providing code to multiple other nodes in the communication network.

With the communication channel established and maintained between the first node and the second node, the second node receives data from the first node over the communication channel. The data may comprise any information, software, instructions, etc., targeted for transfer in the communication network. The second node may execute the second code to handle the data. With the communication channel established and maintained between the second node and the third node, the third node receives data from the second node over the communication channel. The third node may execute the third code to handle the data. Other nodes of the communication network may operate in a similar manner according to the method to transfer data among the nodes and handle the data.

The invention may include other exemplary embodiments described below.

DESCRIPTION OF THE DRAWINGS

The same reference number represents the same element on all drawings.

DETAILED DESCRIPTION OF THE INVENTION

FIGS. 1, 2A-2B, 3A-3D, 4-6 and the following description depict specific exemplary embodiments of the invention to teach those skilled in the art how to make and use the best mode of the invention. For the purpose of teaching inventive principles, some conventional aspects of the invention have been simplified or omitted. Those skilled in the art will appreciate variations from these embodiments that fall within the scope of the invention. Those skilled in the art will appreciate that the features described below can be combined in various ways to form multiple variations of the invention. As a result, the invention is not limited to the specific embodiments described below, but only by the claims and their equivalents.

Communication Network Configuration and Operation—FIGS. 1, 2A-2B, 3A-3D

Figure 1:
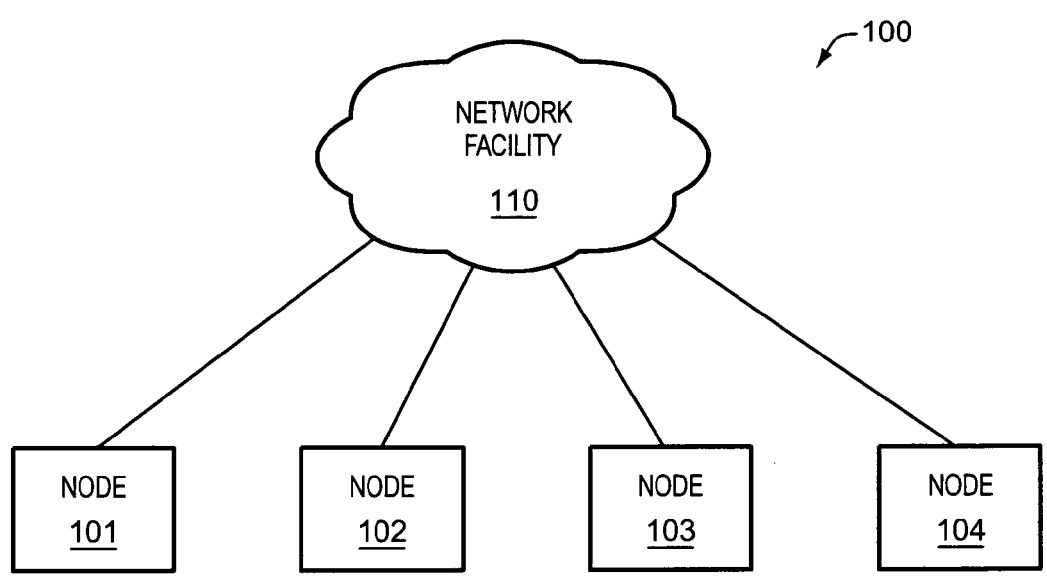
FIG. 1 illustrates a communication network in an exemplary embodiment of the invention.

FIG. 1 illustrates a communication network 100 in an exemplary embodiment of the invention. Communication network 100 includes a plurality of nodes 101-104 capable of communicating with one another over a network facility 110. Network facility 110 may comprise a LAN, a MAN, a WAN, or another type of network. A node may comprise any system, device, component, card, etc, for communication network 100, such as a computer. Communication network 100 may include other nodes, components, devices, or systems not shown in FIG. 1.

Figure 2A:
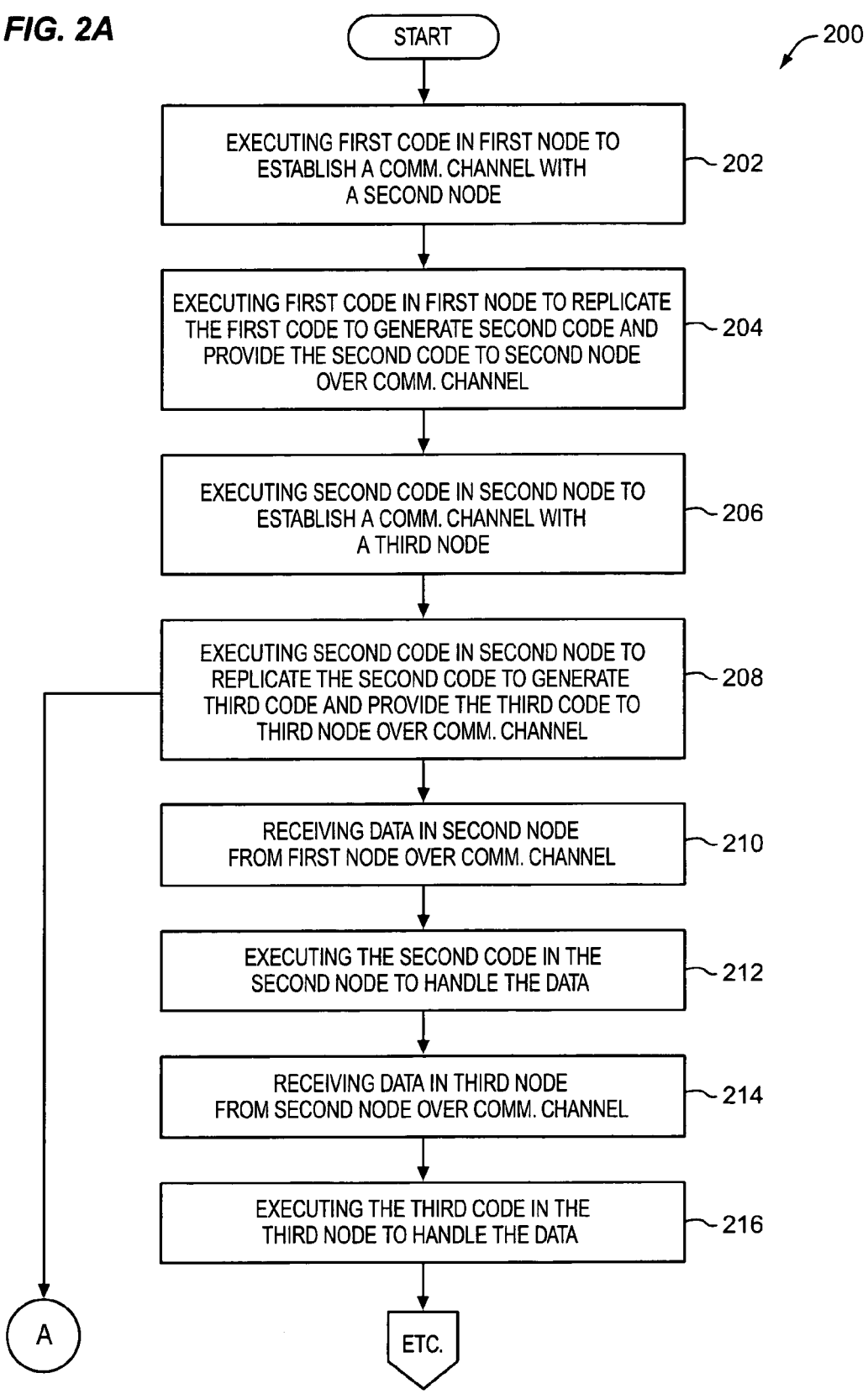
FIGS. 2A-2B are flow charts illustrating a method of operating the communication network of FIG. 1 to transfer data between nodes of the communication network in an exemplary embodiment of the invention.

FIG. 2A is a flow chart illustrating a method 200 of operating communication network 100 to transfer data between nodes 101-104 of communication network 100 in an exemplary embodiment of the invention. Assume for the discussion of method 200 that nodes 101-104 are referred to as first, second, third, and fourth nodes respectively. Further assume that the first node 101 includes first code, and the second node 102 and the third node 103 do not include code resembling or corresponding to the first code.

In step 202 of method 200, the first node 101 executes the first code to establish a communication channel with the second node 102. Code comprises any instructions executable by a processor, such as machine language instructions, programming language instructions (compiled or non-compiled), interpretive language instructions, etc. In step 204, the first node 101 executes the first code to replicate itself to generate second code and provide the second code to the second node 102 over the communication channel. When the first code "replicates" itself to generate the second code, the second code represents a copy or replica of the first code, a substantially similar copy or replica of the first code, or a subset or derivative of the first code. The first node may perform steps 202 and 204 multiple times to establish communication channels with different nodes and provide code to the nodes.

In step 206, the second node 102 executes the second code to establish a communication channel with the third node 103. The communication channel between the first node 101 and the second node 102 may correspond with or be separate from the communication channel between the second node 102 and the third node 103. In step 208, the second node 102 executes the second code to replicate itself to generate third code and provide the third code to the third node 103 over the communication channel. The second node 102 may perform steps 206 and 208 multiple times to establish communication channels with different nodes and provide code to the nodes, as is illustrated by step "A".

With the communication channel established and maintained between the first node 101 and the second node 102, the second node 102 receives data from the first node 101 over the communication channel in step 210. Data may comprise any information, software, instructions, etc., targeted for transfer in the communication network. The second node 102 may also receive control information from the first node 101 over the communication channel. Control information comprises any operations, administration, or management information used by the nodes in the communication network. Responsive to receiving the data, the second node 102 executes the second code to handle the data in step 212. Handling the data may include performing one or more local processes on the data.

For instance, the second code may include a payload process to perform locally on the second node 102. When the second node 102 receives the data, the second node 102 may replicate the data and route the replicated data to the local payload process. The second node 102 may then execute the payload process to receive the replicated data and process the replicated data locally on the second node 102. The payload process may store the data in a particular directory or otherwise process the data.

With the communication channel established and maintained between the second node 102 and the third node 103, the third node 103 receives data from the second node 102 over the communication channel in step 214. The third node 102 may also receive control information from the first node 101 over the communication channel. Responsive to receiving the data, the third node 103 executes the third code to handle the data in step 216. Handling the data may include performing one or more local processes on the data.

Method 200 may include more steps to linearly transfer the data to other nodes in this manner until the data is transferred to the desired nodes. Method 200 illustrates the data being transferred in a linear chain through communication network 100. However, method 200 is not limited to linear transfers, as is illustrated in FIG. 2B.

Figure 2B:
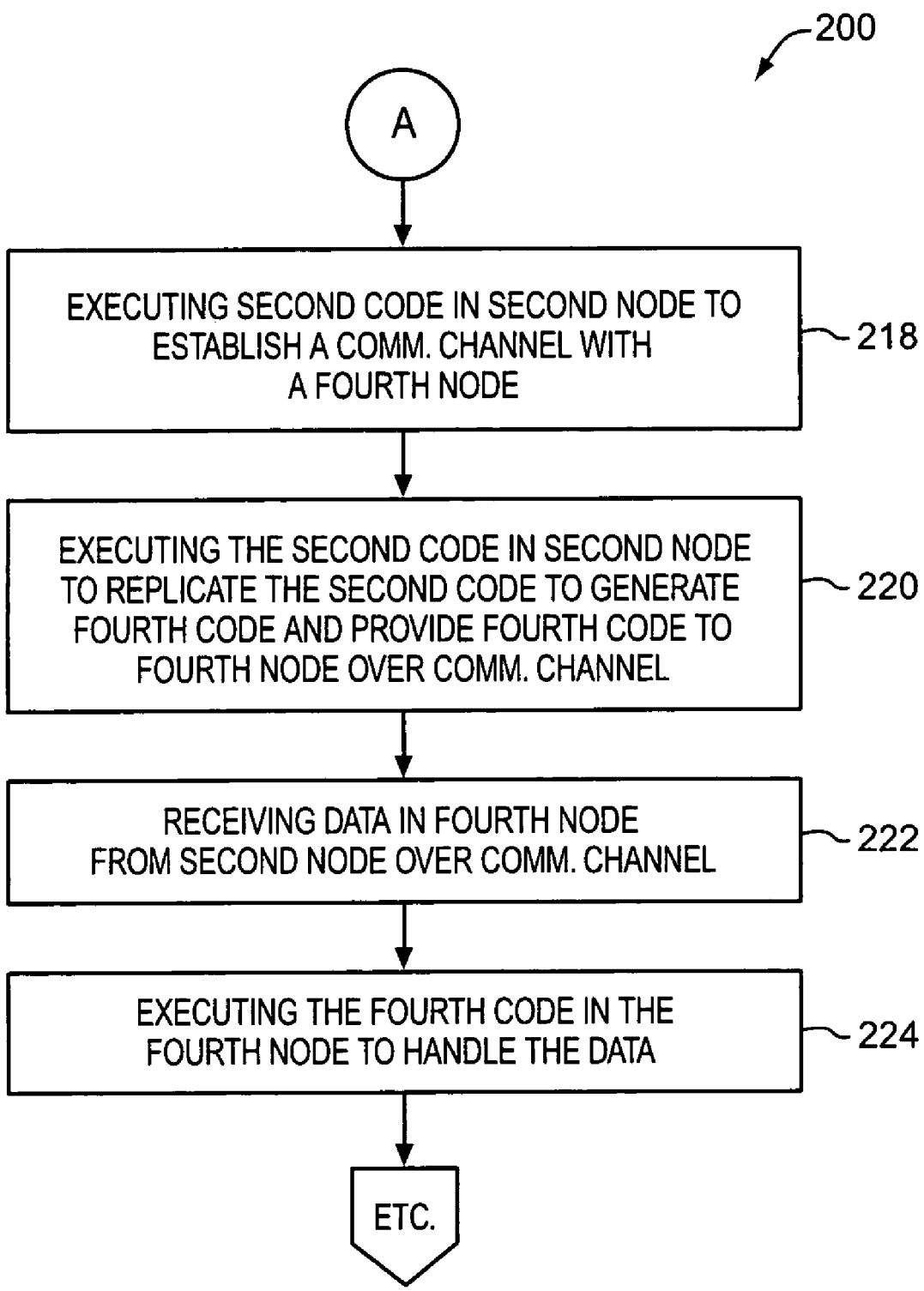

FIG. 2B is a flow chart illustrating additional steps that may be used in method 200. In step 218, the second node 102 further executes the second code to establish a communication channel with a fourth node 104, in addition to establishing the communication channel with the third node 103 (see step 206 in FIG. 2A). In step 220, the second node 102 executes the second code to replicate itself to generate fourth code and provide the fourth code to the fourth node 104 over the communication channel. With the communication channel established and maintained between the second node 102 and the fourth node 104, the fourth node 104 receives data from the second node 102 over the communication channel in step 222. The fourth node 104 may also receive control information from the first node 101 over the communication channel. Responsive to receiving the data, the fourth node 104 executes the fourth code to handle the data in step 224. Handling the data may include performing one or more local processes on the data.

Method 200 may continue with similar steps until the data is transferred to the desired nodes.

Figure 3C:
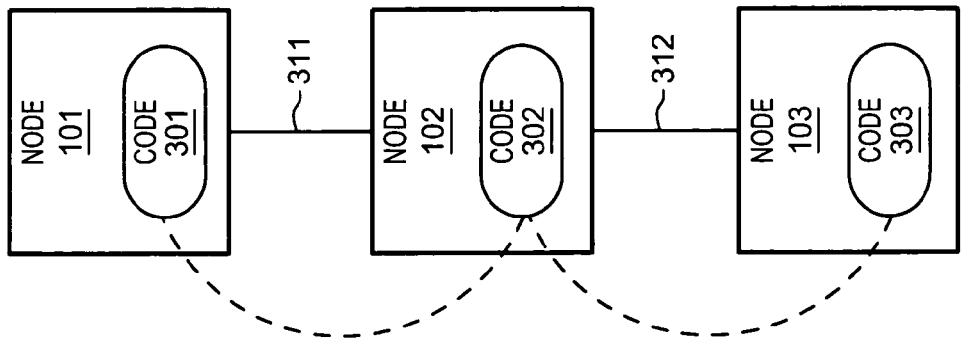
FIGS. 3A-3D illustrate how code and data may be transferred in the communication network of FIG. 1 according to the method of FIGS. 2A-2B in an exemplary embodiment of the invention.
Figure 3B:
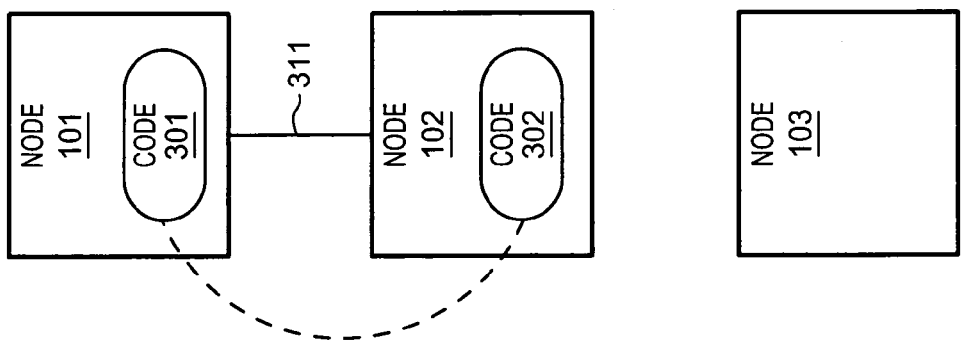
Figure 3A:
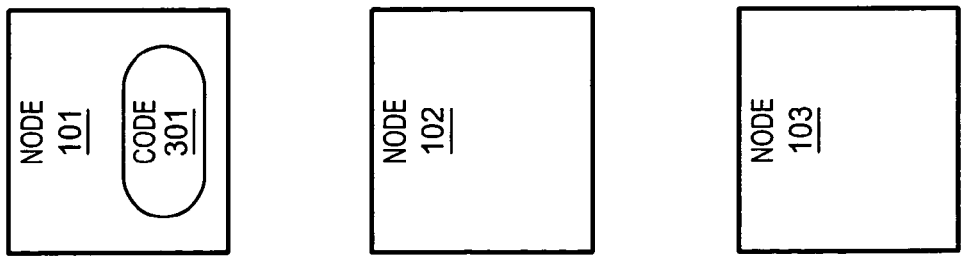

FIGS. 3A-3D illustrate how code and data is transferred in communication network 100 according to method 200 in an exemplary embodiment of the invention. FIG. 3A illustrates the first, second, and third nodes 101-103 of communication network 100. Node 101 includes the first code 301 and nodes 102-103 do not initially include code resembling or corresponding to code 301.

Node 101 executes code 301 to establish a communication channel 311 with node 102 (see FIG. 3B). Node 101 also executes code 301 to replicate itself to generate second code 302, and provide code 302 to node 102 over the communication channel 311. Node 101 may perform this operation for multiple nodes not shown in FIG. 3B.

Node 102 executes code 302 to establish a communication channel 312 with node 103 (see FIG. 3C). Communication channel 312 may comprise the same channel as communication channel 311. Node 102 also executes code 302 to replicate itself to generate third code 303, and provide code 303 to node 103 over the communication channel 312. Node 102 may perform this operation for multiple nodes not shown in FIG. 3C.

Figure 3D:
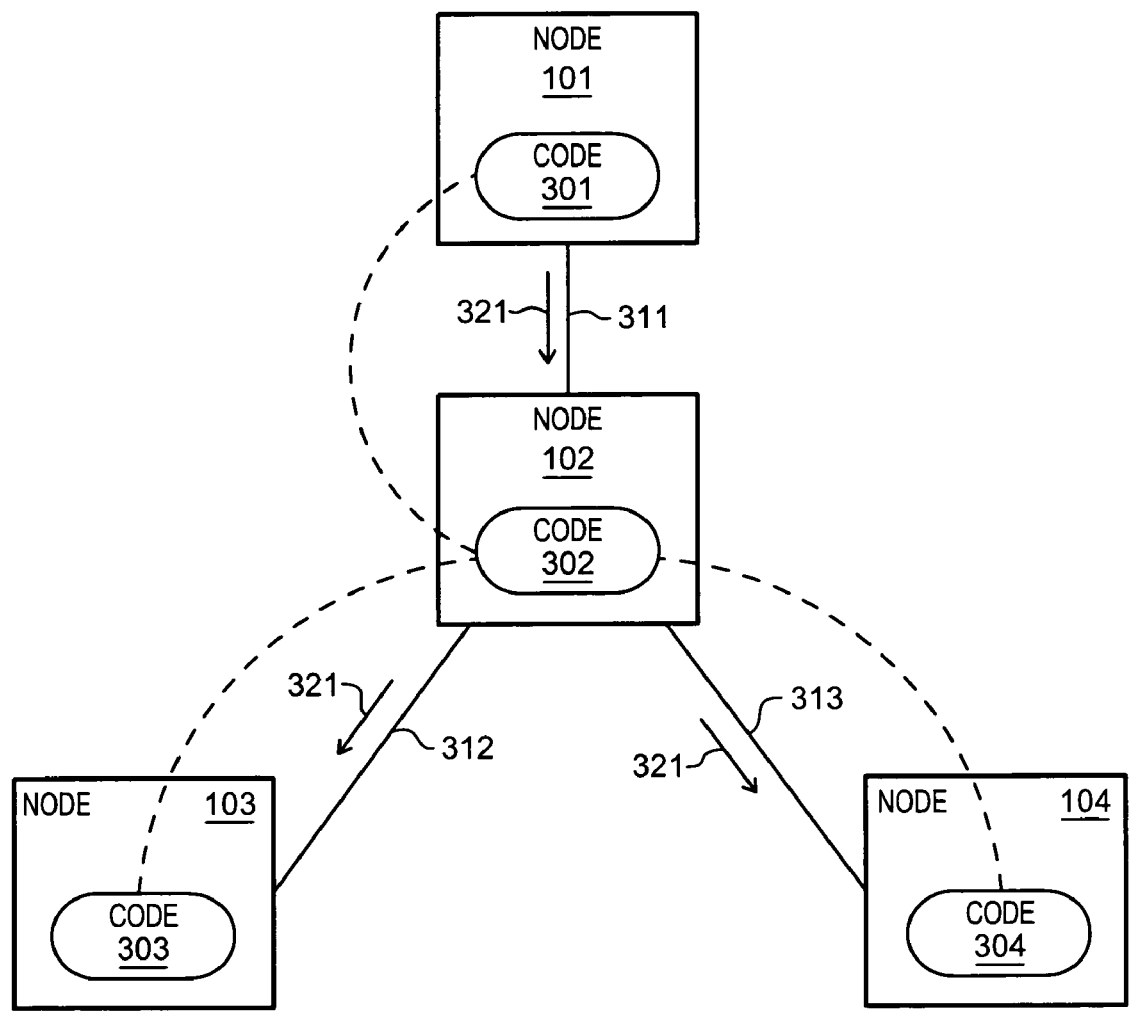

Node 102 may also execute code 302 to establish a communication channel 313 with node 104 (see FIG. 3D). Communication channel 313 may comprise the same channel as communication channels 311-312. Node 102 executes code 302 to replicate itself to generate fourth code 304, and provide code 304 to node 104 over the communication channel 313.

With communication channel 311 established and maintained, node 102 receives data 321 from node 101 over the communication channel 311 (see FIG. 3D). Data may comprise any information, software, instructions, etc., targeted for transfer in the communication network. Responsive to receiving the data 321, node 102 executes code 302 to handle the data 321. For instance, node 102 may execute code 302 to perform one or more local processes on the data 321.

With communication channel 312 established and maintained, node 103 receives data 321 from node 102 over the communication channel 312. Responsive to receiving the data 321, node 103 executes code 303 to handle the data 321. For instance, node 103 may execute code 303 to perform one or more local processes on the data 321.

With communication channel 313 established and maintained, node 104 receives data 321 from node 102 over the communication channel 313. Responsive to receiving the data 321, node 104 executes code 304 to handle the data 321. For instance, node 104 may execute code 304 to perform one or more local processes on the data 321.

Advantageously, network personnel may use the self-replicating code as described in this embodiment to efficiently transfer data to multiple nodes 101-104 on communication network 100, without sacrificing the bandwidth of the network 100. Also, network personnel do not need to pre-install code on nodes 102-104 of communication network 100 to facilitate the data transfer. The self-replicating code can spawn itself on the nodes 102-104 of the network 100 to facilitate the data transfer.

Figure 4:
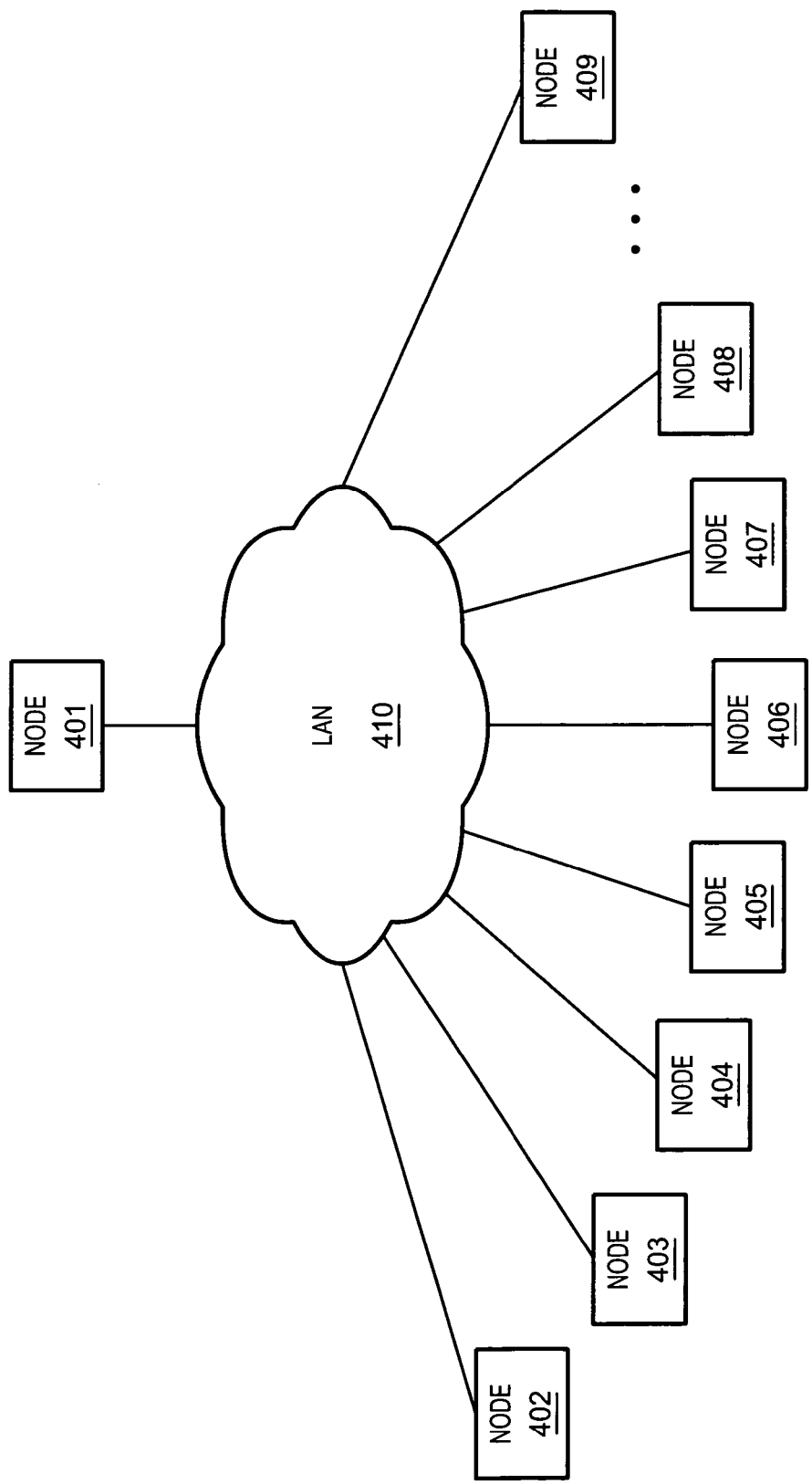
FIG. 4 illustrates a communication network in another exemplary embodiment of the invention.
Figure 5:
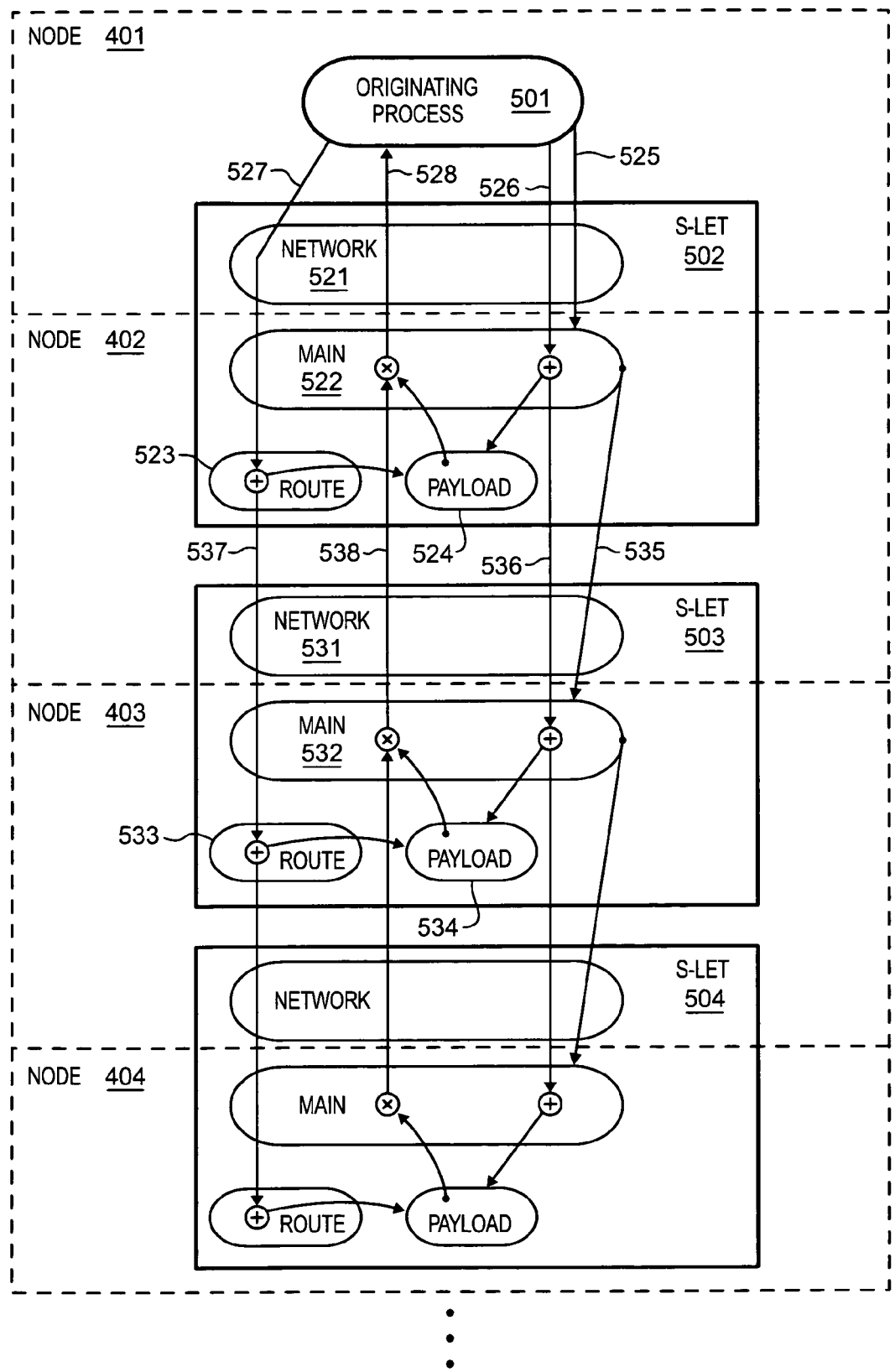
FIG. 5 illustrates a linear sworm topology in an exemplary embodiment of the invention.
Figure 6:
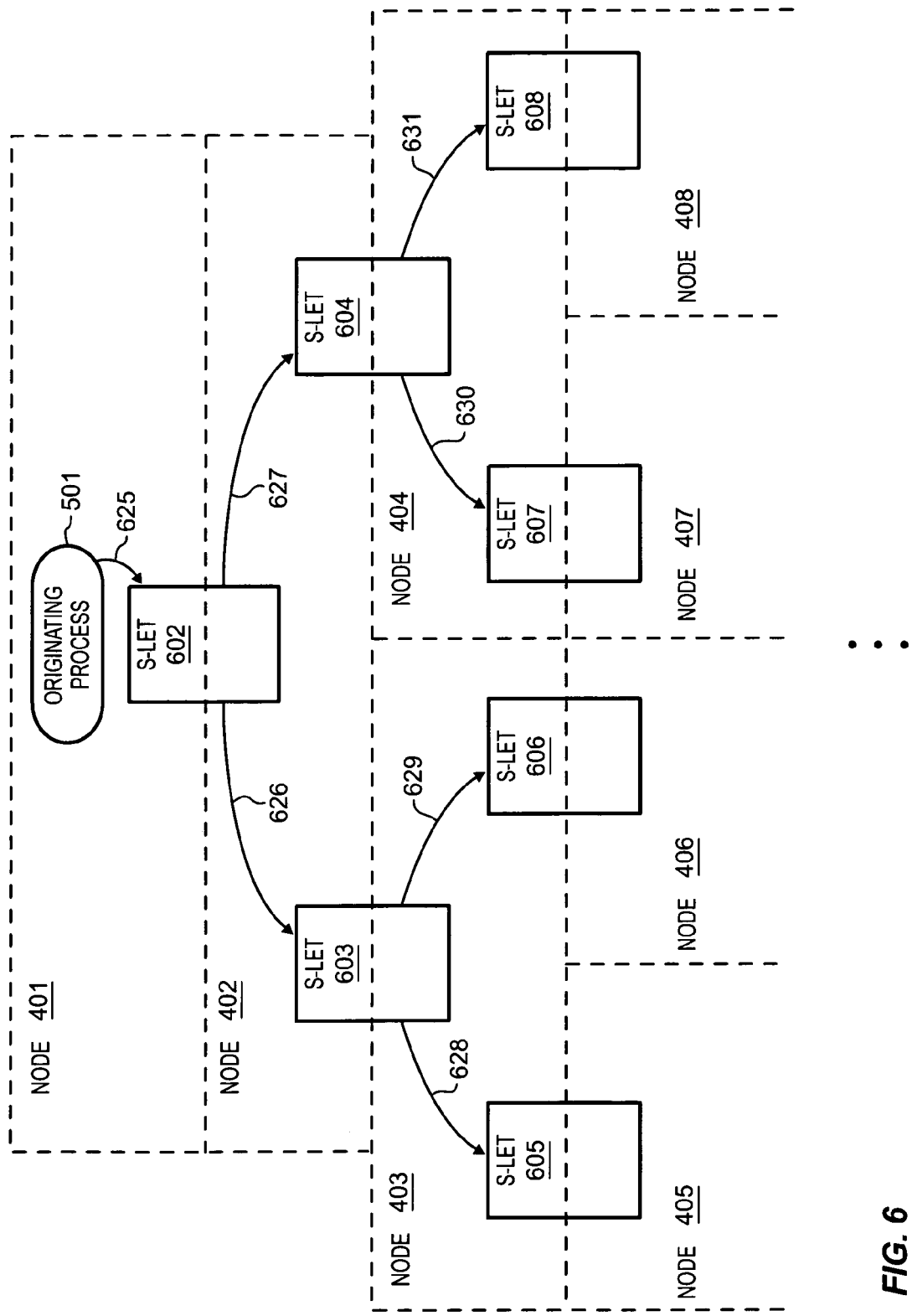
FIG. 6 illustrates a tree sworm topology in an exemplary embodiment of the invention.

Communication Network—FIGS. 4-6

FIG. 4 illustrates a communication network 400 in an exemplary embodiment of the invention. Communication network 400 includes a plurality of nodes 401-409 capable of communicating with one another over a LAN 410. LAN 410 comprises any kind of trusted network where access to the nodes 401-409 from the LAN 410 is not blocked by firewalls or other protection mechanisms. In other embodiments, LAN 410 may comprise an intranet, a MAN, a WAN, or another type of enterprise network. A node may comprise any system, device, component, card, etc, for communication network 400, such as a computer. Nodes 401-409 are remote from each other, meaning that they communicate with one another over LAN 410. Communication network 400 may include other nodes, components, devices, or systems not shown in FIG. 4.

Assume that node 401 is a controller node operated by network personnel. Further assume that network personnel want to transfer a large data stream to all nodes 402-409 in communication network 400. For instance, the network personnel may need to install new software on nodes 402-409, where the software comprises a large data stream. It would be inefficient for the network personnel to install the software individually on each machine. If the network personnel tried to simultaneously transfer the software as a large data stream to multiple nodes 402-409, then the bandwidth of LAN 410 may be compromised. The network personnel may use self-replicating code according to the invention to efficiently transfer the software to nodes 402-409 without compromising the bandwidth of LAN 410.

In this embodiment, self-replicating code may be referred to as a streaming worm. A streaming worm (sworm) comprises any software, code, or instructions that can replicate itself, as well as a chunk of arbitrary payload code, on a set of nodes in a communication network, while streaming data between the nodes. Each sworm is composed of one or more swormlets that can be arranged in a variety of topologies. A sworm is spawned by an originating process, which may control the transfer of a data stream, which nodes to include, etc.

Each swormlet includes swormlet code, payload code, and a data stream. The swormlet code comprises the code used to spawn new swormlets on nodes, maintain the transfer of a data stream between the nodes, etc. Payload code comprises the code to be locally performed on a node. The data stream comprises the data being transferred within the communication network 400.

Assume that node 401 includes an originating process (not shown) that originates the sworm. Because network personnel want to transfer a large data stream (i.e., software) to many nodes of the network 400, a linear sworm may be the most efficient topology for transferring large data streams. A linear sworm may work the best because the bandwidth of LAN 410 does not have to be split between the swormlets of the sworm. Only one copy of the large data stream needs to be transferred over the LAN 410 at a time with the linear sworm, as is illustrated below.

FIG. 5 illustrates a linear sworm topology in an exemplary embodiment of the invention. To create the linear sworm topology, the following takes place. The originating process 501 in node 401 spawns swormlet 502 (referred to in FIG. 5 as S-LET). More particularly, the originating process 501 initiates a networking process 521 on node 401. The networking process 521 is configured to execute on node 401 to establish a communication channel with a remote terminating node, and act as a conduit for program code, control information, and a data stream sent to and from the remote node. Thus, networking process 521 executes on node 401 to establish a communication channel with node 402. Originating process 501 then uses networking process 521 as a conduit to transfer a copy of the swormlet code over the communication channel, as is illustrated by arrow 525.

Networking process 521 may transfer the copy of the swormlet code to node 402 using a remote shell command, such as remsh, rsh, or ssh. The networking process 521 may use the remote shell command to transfer and remotely execute an in-line Perl bootstrap script on node 402 that pulls the swormlet code over the communication channel from node 401. Each swormlet 502 spans two nodes in this embodiment.

Node 402 executes the swormlet code to perform a main swormlet process 522, a routing process 523, and a payload process 524 for swormlet 502. The main swormlet process 522 receives the payload code from the originating process 501 over the communication channel, as is illustrated by arrow 526. The main swormlet process 522 replicates the payload code and forwards the copy of the payload code to the payload process 524. The main swormlet process 522 forwards the payload code to another swormlet (if necessary) as is described below. The main swormlet process 522 initiates the payload process 524 to execute the payload code.

To form the linear sworm topology, the main swormlet process 522 spawns swormlet 503. In other embodiments, main swormlet process 522 may spawn other swormlets. In spawning swormlet 503, the main swormlet process 522 initiates a networking process 531 on node 402. The networking process 531 executes on node 402 to establish a communication channel with node 403. Swormlet 502 then uses networking process 531 as a conduit to transfer a copy of the swormlet code over the communication channel, as is illustrated by arrow 535.

Node 403 executes the swormlet code to perform a main swormlet process 532, a routing process 533, and a payload process 534 for swormlet 503. The main swormlet process 532 of swormlet 503 receives payload code from the main swormlet process 522 of swormlet 502 over the communication channel, as is illustrated by arrow 536. The main swormlet process 532 replicates the payload code and forwards the copy of the payload code to the payload process 534. The main swormlet process 532 forwards the payload code to another swormlet (if necessary). The main swormlet process 532 initiates the payload process 534 to execute the payload code.

Swormlets are spawned in a similar manner through nodes 401-409 of the communication network 400 (see FIG. 4) as designated by the originating process 501. Once the swormlets are spawned and communication channels are established between the nodes 401-409, then a data stream may be transferred between the nodes 401-409.

Originating process 501 transfers a data stream to swormlet 502. The data stream in this embodiment comprises software that is a large data stream. The main swormlet process 522 initiates the routing process 523 in swormlet 502. The routing process 523 in swormlet 502 receives the data stream from the originating process 501 over the communication channel, as is illustrated by arrow 527. The routing process 523 replicates the data stream, and forwards a copy of the data stream to the payload process 524. The routing process 523 forwards the data stream to another swormlet (if necessary) as addressed or specified by the originating process 501. The payload process 524 receives the copy of the data stream from the routing process 523. The payload process 524 executes the payload code to locally handle the data stream. For instance, the payload code may direct the payload process 524 to store the data stream in a known directory on node 402.

The routing process 523 may also receive control instructions from the originating process 501. The routing process 523 may execute the control instructions on the payload process 524. The routing process 523 may also forward the control instructions to another swormlet (if necessary) or node.

In executing the payload code, the payload process 524 may generate output data. The payload process 524 forwards the output data to the main swormlet process 522. The main swormlet process 522 receives the output data from the payload process 524 and/or status information from any of the processes. The main swormlet process 522 multiplexes the output data and/or status information from the payload process 524 and from child swormlets and forwards the output data and/or status information over the communication channel, as is illustrated by arrow 528. The status information may comprise feedback on the success of storing the large data stream on node 402. The networking process 521 maintains the communication channel between nodes 401 and 402 so that output data and/or status information may be exchanged between the nodes.

The main swormlet process 523 in swormlet 503 initiates the routing process 533. The routing process 533 in swormlet 503 receives the data stream (i.e., software in this embodiment) from the routing process 523 in swormlet 502 over the communication channel, as is illustrated by arrow 537. The routing process 533 replicates the data stream, and forwards a copy of the data stream to the payload process 534. The routing process 523 forwards the data stream to another swormlet (if necessary) as addressed or specified by the originating process 501. The payload process 534 receives the copy of the data stream from the routing process 533. The payload process 534 executes the payload code to locally handle the data stream. For instance, the payload code may direct the payload process 534 to store the data stream in a known directory on node 403.

The originating process 501 may designate which nodes are to receive the data stream, and in which order, based on a map, a set of instructions, an addressing scheme, etc. The originating process 501 may address the data stream to one or more swormlets 502-504 or broadcast to all swormlets 502-504. Based on the designation by the originating process 501, the routing process 533 forwards the data stream to the next node or prepares to forward the data stream to the next node or additional other child nodes.

The routing process 533 may also receive control instructions from the routing process 523. The routing process 533 may execute the control instructions on the payload process 534. The routing process 533 may also forward the control instructions to another swormlet (if necessary).

In executing the payload code, the payload process 534 may generate output data. The payload process 534 forwards the output data to the main swormlet process 522. The main swormlet process 532 may receive the output data from the payload process 534 and/or status information from any of the processes. The main swormlet process 532 multiplexes the output data and/or status information from the payload process 534 and from child swormlets and forwards the output data and/or status information over the communication channel, as is illustrated by arrow 538. The status information may comprise feedback on the success of storing the large data stream on node 403. The networking process 531 maintains the communication channel between nodes 402 and 403 so that data and/or status information may be exchanged between the nodes.

The data stream may be transferred in a similar manner through nodes 404-409 of the communication network 400 (see FIG. 4) as designated by the originating process 501. Because the data stream is software in this example, network personnel can install the software on each node 402-409. The swormlets may be torn down after the transfer of the data stream or used to transfer other data streams.

Transferring the data stream to the nodes 402-409 of the communication network 400 in FIG. 4 according to the process described above provides many advantages. First, the nodes 402-409 do not need to initially have any special code to receive the data stream. The swormlets will replicate themselves on the nodes 402-409 to provide the needed code. The nodes may then execute the code in parallel to more efficiently transfer the data stream. Second, network personnel can get feedback on the status of the transfer. Each swormlet maintains the communication channel between the nodes and provides status information back to the originating process 501. Thus, network personnel can view the status information to determine the status of the data stream transfer. Third, the bandwidth of the LAN 410 will most likely not be compromised by the data stream transfer. Only one copy of the data stream should be present on the LAN 410 at any one time in a linear topology, as the nodes pass the one copy of the data stream, block by block, from node to node until the final node is reached.

Assuming each node 402-409 now includes a copy of the software previously transferred, the network personnel may further want to remotely install the software on the nodes 402-409. The network personnel may use another sworm to perform the remote installation, by transferring a data stream that includes instructions for installing the software. The data stream will most likely not be large, especially in comparison to the software itself. Thus, to transfer smaller data streams in communication network 400, a linear sworm may not be the most efficient topology, as the propagation delay may be too long. A tree sworm may be a better topology for transferring smaller data streams.

FIG. 6 illustrates a tree sworm topology in an exemplary embodiment of the invention. To create the tree sworm topology, the following takes place. The originating process 501 in node 401 spawns swormlet 602 (referred to in FIG. 6 as s-let). Swormlet 602 establishes a communication channel with node 402 so that swormlet 602 spans two nodes 401-402. Swormlet 602 may include a networking process, a main swormlet process, a routing process, and a payload process, which are not shown in this embodiment for the sake of brevity.

Based on a list provided by the originating process 501, swormlet 602 spawns swormlets 603 and 604. Swormlet 603 operating in node 402 establishes a communication channel with node 403 so that swormlet 603 spans two nodes 402-403. Swormlet 603 spawns swormlets 605-606. Swormlet 605 operating in node 403 establishes a communication channel with node 405 so that swormlet 605 spans two nodes 403 and 405. Swormlet 606 operating in node 403 establishes a communication channel with node 406 so that swormlet 606 spans two nodes 403 and 406. Swormlet 604 operating in node 402 spawns swormlets 607-608. Swormlet 607 operating in node 404 establishes a communication channel with node 407 so that swormlet 607 spans two nodes 404 and 407. Swormlet 608 operating in node 404 establishes a communication channel with node 408 so that swormlet 608 spans two nodes 404 and 408. Swormlets may be spawned to multiple other nodes not shown in FIG. 6.

When the communication channels are established, originating process 501 transfers a copy of the data stream to swormlet 602, as is illustrated by arrow 625. The data stream in this embodiment comprises a set of instructions for installing software on the nodes. Swormlet 602 forwards a copy of the data stream to swormlet 603, as is illustrated by arrow 626 and forwards a copy of the data stream to swormlet 604, as is illustrated by arrow 627. Swormlet 603 forwards a copy of the data stream to swormlet 605, as is illustrated by arrow 628, and forwards a copy of the data stream to swormlet 606, as is illustrated by arrow 629. Swormlet 604 forwards a copy of the data stream to swormlet 607, as is illustrated by arrow 630, and forwards a copy of the data stream to swormlet 608, as is illustrated by arrow 631.

The swormlets forward the data stream to each node instructed to receive the data stream by the originating process 501. FIG. 6 shows a binary tree topology for transferring the data. However, an asymmetric tree topology may also be used.

Multiple swormlets 602-608 may be streaming the data stream in parallel to more efficiently transfer the data stream. Transferring the data stream in the manner described above quickly and efficiently provides each node with the data stream. The data stream in this embodiment comprises instructions for installing software. Thus, network personnel may quickly and efficiently transfer the instructions to multiple nodes so that the software may be installed on the nodes.

In FIG. 6, the originating process 501 acts as the only originating process for the sworm. In other embodiments, a payload process of any of the swormlets 602-608 may act as an originating process for another new and independent sworm. Thus, a complex tree of sworms may be constructed in a recursive manner.

I claim:

1. A method of operating a communication network to transfer data between nodes of the communication network, the communication network comprising a first node that includes first self-replicating code comprising software used in the data transfer, and also comprises at least a second node and a third node that do not initially include the software used in the data transfer, the method comprising the steps of:

executing the first self-replicating code in the first node to establish a communication channel with the second node, to replicate the first self-replicating code to generate second self-replicating code comprising the software used in the data transfer, and to provide the second self-replicating code to the second node over the communication channel;

executing the second self-replicating code in the second node to establish the communication channel with the third node, to replicate the second self-replicating code to generate third self-replicating code comprising the software used in the data transfer, and to provide the third self-replicating code to the third node over the communication channel;

receiving streaming data for the data transfer in the second node from the first node over the communication channel and executing the second self-replicating code in the second node to replicate the streaming data received from the first node, and to route the replicated streaming data to a payload process in the second node; and receiving the streaming data in the third node from the second node over the communication channel and executing the third self-replicating code in the third node to replicate the streaming data received from the second node, and to route the replicated streaming data to a payload process in the third node.

2. The method of claim 1 further comprising the steps of:

executing the second self-replicating code in the second node to establish the communication channel with a fourth node, to replicate the second self-replicating code to generate fourth self-replicating code comprising the software used in the data transfer, and to provide the fourth self-replicating code to the fourth node over the communication channel; and receiving the streaming data in the fourth node from the second node over the communication channel and executing the fourth self-replicating code in the fourth node to replicate the streaming data received from the second node, and to route the replicated streaming data to a payload process in the fourth node.

3. The method of claim 1 further comprising the step of:
executing the payload process in the second node to receive the replicated streaming data and process the replicated streaming data locally on the second node.

4. The method of claim 3 further comprising the step of:
executing the payload process in the second node to generate output data.

5. The method of claim 4 further comprising the step of:
executing the second self-replicating code in the second node to multiplex the output data and status information from the second node and forward the output data and the status information over the communication channel to the first node.

6. The method of claim 5 further comprising the step of:
receiving control information in the second node from the first node over the communication channel and using the control information in the second node to handle the streaming data.

7. The method of claim 6 further comprising the step of:
routing the streaming data and the control information from the second node to the third node over the communication channel.

8. The method of claim 1 wherein the first self-replicating code comprises a streaming worm.

9. The method of claim 1 wherein the second node is remote from the first node and the third node is remote from the second node.

10. A communication network that provides for the transfer of data between nodes of the communication network, the communication network comprising:
a first node that includes first self-replicating code comprising software used in the data transfer;
a second node that does not initially include the software used in the data transfer; and
a third node that does not initially include the software used in the data transfer;
the first node, responsive to executing the first self-replicating code, establishes a communication channel with the second node, replicates the first self-replicating code to generate second self-replicating code comprising the software used in the data transfer, and provides the second self-replicating code to the second node over the communication channel;
the second node, responsive to executing the second self-replicating code, establishes the communication channel with the third node, replicates the second self-replicating code to generate third self-replicating code comprising the software used in the data transfer, and provides the third self-replicating code to the third node over the communication channel;
the second node receives streaming data from the first node over the communication channel and executes the second self-replicating code to replicate the streaming data received from the first node, and to route the replicated streaming data to a payload process in the second node; and
the third node receives the streaming data from the second node over the communication channel and executes the third self-replicating code to replicate the streaming data received from the second node, and to route the replicated streaming data to a payload process in the third node.

11. The communication network of claim 10 further comprising a fourth node, wherein:
the second node, responsive to executing the second self-replicating code, establishes the communication channel with the fourth node, replicates the second self-replicating code to generate fourth self-replicating code comprising the software used in the data transfer, and provides the fourth self-replicating code to the fourth node over the communication channel; and
the fourth node receives the streaming data from the second node over the communication channel and executes the fourth self-replicating code to replicate the streaming data received from the second node, and to route the replicated streaming data to a payload process in the fourth node.

12. The communication network of claim 10 wherein the second node, responsive to executing the payload process, receives the replicated streaming data and processes the replicated streaming data locally.

13. The communication network of claim 12 wherein the second node generates output data responsive to executing the payload process.

14. The communication network of claim 13 wherein the second node, responsive to executing the second self-replicating code, multiplexes the output data and status information from the second node, and forwards the output data and status information over the communication channel to the first node.

15. The communication network of claim 10 wherein the second node receives control information from the first node over the communication channel and uses the control information to handle the streaming data.

16. The communication network of claim 15 wherein the second node routes the data and the control information to the third node over the communication channel.

17. The communication network of claim 10 wherein the first self-replicating code comprises a streaming worm.

18. The communication network of claim 10 wherein the second node is remote from the first node and the third node is remote from the second node.

* * * * *